Dec. 7, 1937.  F. CARTLIDGE  2,101,238
GATHERING OR PICK-UP CONVEYER
Original Filed Nov. 10, 1934   2 Sheets—Sheet 1

Witness
Erwin C. Lange

Inventor
Frank Cartlidge
Clarence T. Poole
Attorney

Dec. 7, 1937.  F. CARTLIDGE  2,101,238
GATHERING OR PICK-UP CONVEYER
Original Filed Nov. 10, 1934  2 Sheets-Sheet 2
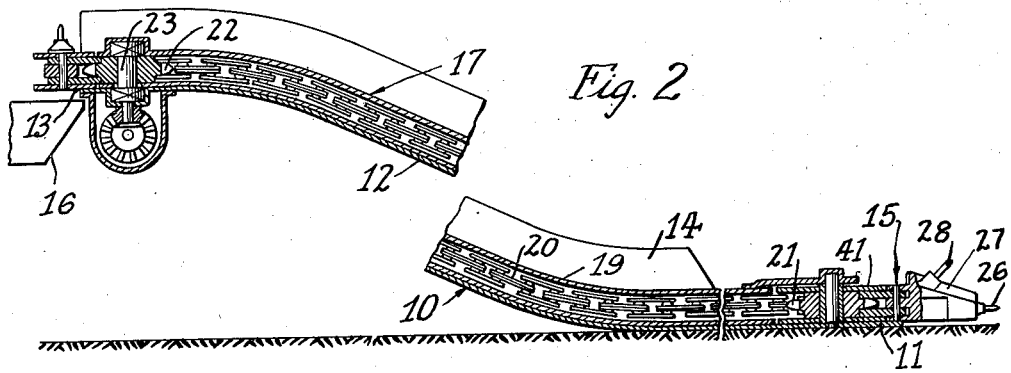
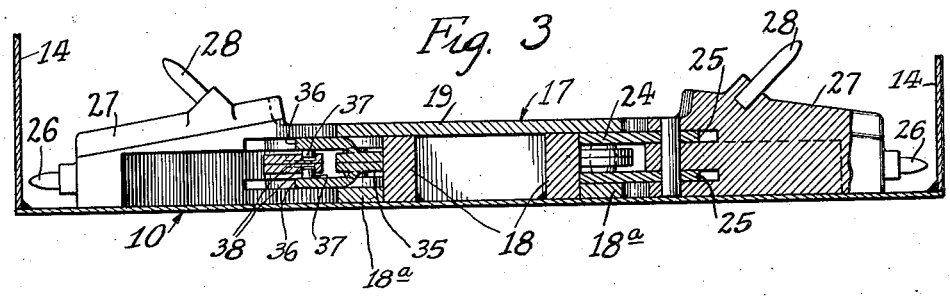
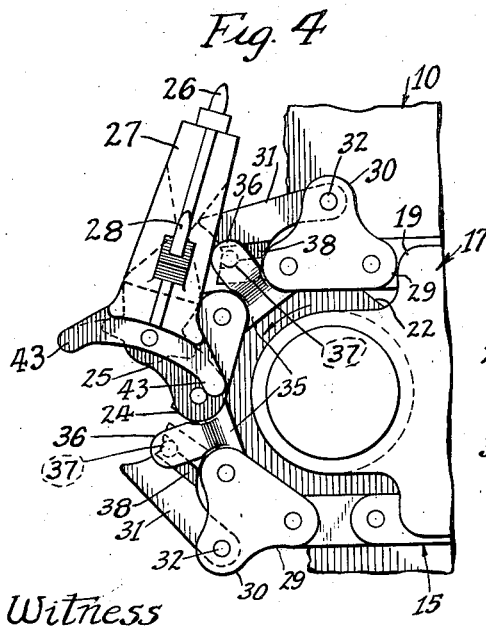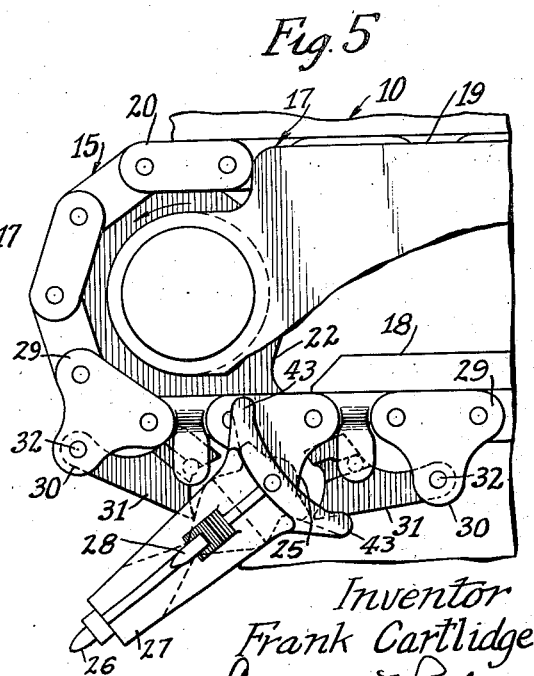
Witness
Erwin C. Lange
Inventor
Frank Cartlidge
Clarence F. Poole
Attorney

UNITED STATES PATENT OFFICE 2,101,238

GATHERING OR PICK-UP CONVEYER

Frank Cartlidge, Chicago, Ill., assignor to Goodman Manufacturing Company, Chicago, Ill., a corporation of Illinois Application November 10, 1934, Serial No. 752,431
Renewed May 6, 1937

20 Claims. (Cl. 198—8)

My invention relates to improvements in gathering or pick-up conveyers and more particularly to gathering conveyers of the type which are adapted to load by swinging movement across a coal face for gathering coal and discharging it onto a secondary or discharge conveyer.

In carrying out my invention, I provide a pan having an endless chain movable therealong in a plane parallel to the plane of said pan and having gathering flights pivoted thereon which are adapted to extend laterally therefrom during the conveying and gathering operation and fold rearwardly with respect thereto as they round the drive sprocket at the discharge end of said pan.

Among the objects of my invention are to provide a novel means which will delay the turning action of the flights as they round the sprocket at the discharge end of the conveyer which is of a positive acting, simple construction, and also hold said gathering flights in a laterally extended position with respect to the chain during the conveying and gathering operations.

My invention may be more clearly understood with reference to the accompanying drawings wherein:

Figure 2 is a fragmentary longitudinal sectional view of the embodiment shown in Figure 1, drawn to a reduced scale;

Figure 3 is a sectional view taken substantially along lines 3—3 of Figure 1;

Figure 4 is a detail view of one of the gathering flights in a folded position with respect to the chain; and Figure 5 is another detail view of the same gathering flight in a different position than in Figure 4.

Figure 1:
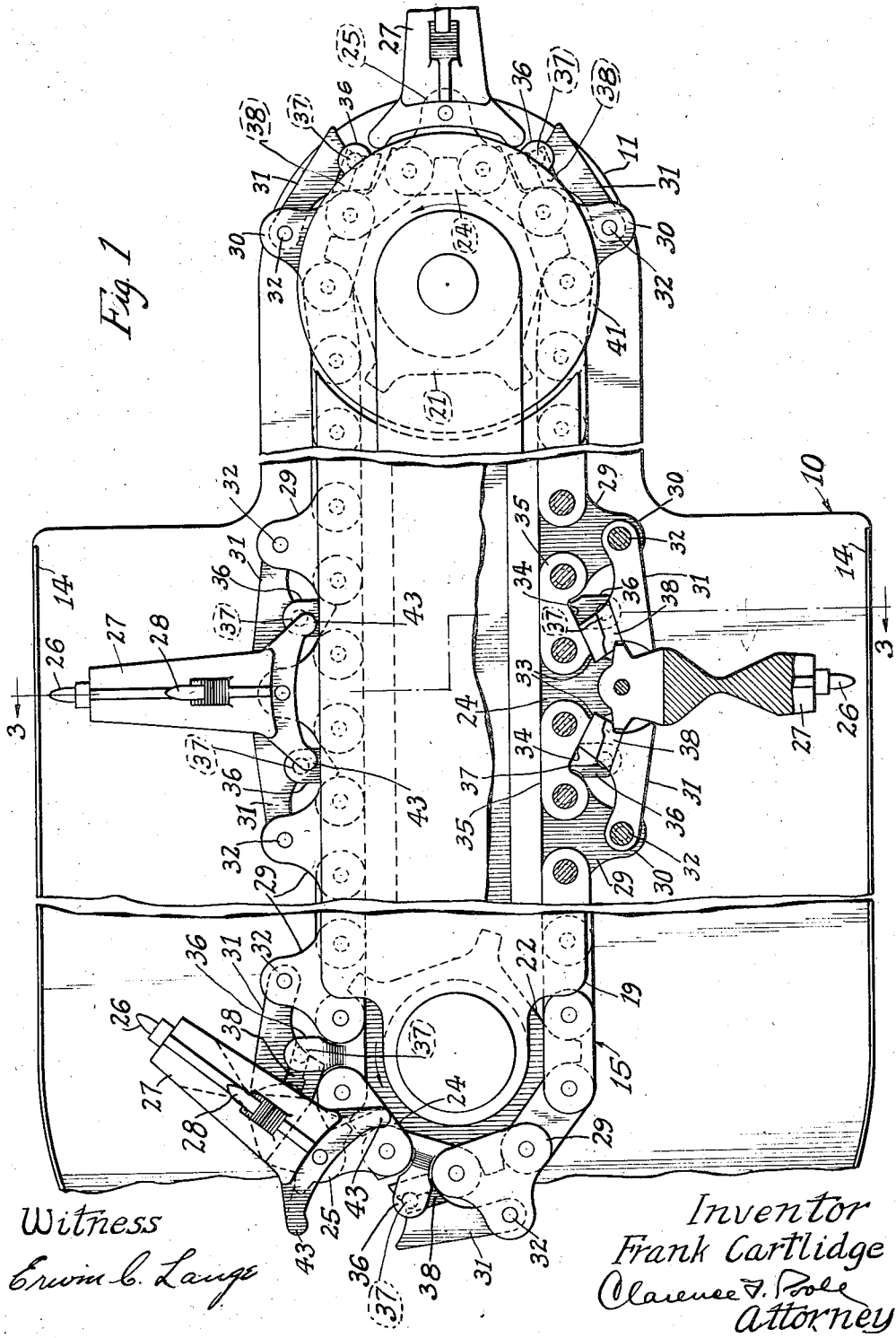
Figure 1 is a fragmentary top plan view of a gathering conveyer constructed in accordance with my invention with certain parts broken away and shown in section.

Referring now in particular to the drawings, the embodiment of my invention illustrated therein includes a pan 10 having a forward end 11 adapted to rest on and slide along the mine bottom, an intermediate inclined portion 12 and a relatively horizontal discharge portion 13. Said pan is provided with upstanding sides 14, 14 extending rearwardly of the forward end thereof for retaining material thereon and permitting it to be moved therealong by gathering and conveying mechanism, generally indicated by reference character 15. A discharge conveyer, generally indicated by reference character 16 (see Figure 2) is adapted to be disposed beneath the discharge end of said pan for receiving material discharged by said gathering and conveying mechanism. Said pan and discharge conveyer may be a part of a unitary loading mechanism of any suitable construction, which is not herein shown in detail since it is no portion of my present invention.

With reference now in particular to the gathering and conveying mechanism 15, a chain guide, generally indicated by reference character 17, extends along the pan 10 from the forward to discharge end thereof and generally conforms to the inclination of said pan. Said chain guide, as herein shown, includes a pair of parallel-spaced members 18, 18 extending along and secured to the top surface of said pan in a suitable manner and a plate 19 secured to the top surface of said members in parallel relation with respect to said pan and extending beyond opposite sides of said members. Wearing strips 18a, 18a abut the outer side of said guide members and the upper surface of said pan. The projecting under sides of said plate and upper surface of said wearing strips form guide grooves in which an endless chain 20 may be guided.

The endless chain 20 is trained around an idler sprocket 21 disposed adjacent the forward end of said chain guide and a drive sprocket 22 disposed adjacent the rearward end of said guide and the discharge end of said pan. Said guide and pan may be arranged in a suitable manner (not shown) so that said chain may readily be adjusted for wear. The drive sprocket 22 is herein shown as being keyed on a vertical shaft 23 driven through a train of bevel gears from a suitable motor (not shown) in a usual manner.

The endless chain 20 comprises a plurality of spaced links pivotally connected together by ball and socket connections in a usual manner so that it may travel in more than one plane. Certain links 24 of said chain are provided with projections 25 extending laterally therefrom which are adapted to have a gathering flight 27 pivotally connected thereto. Each gathering flight is provided with a pair of parallel-spaced slots which are adapted to receive the projections 25, 25 of each link 24 and pivotally support said gathering flights for movement about an axis perpendicular to the plane of travel of said chain. Said flights are suitably spaced along said chain in such a manner that each flight may act as an independent gathering means and not interfere with the operation of the other flight. Each of said flights is provided with an outwardly projecting bit 26 and a bit 28 extending angularly upwardly therefrom for cutting through tight or unsevered coal.

The endless chain 20 is provided with a plurality of links 29, 29 one of which is spaced two links forwardly of each of said flights and the other of which is spaced two links rearwardly of each of said flights. Projections 30, 30 extend outwardly from each of said links and said projections are adapted to have a dog 31 pivotally mounted therebetween on a pin 32. Said dogs extend toward the gathering flights 27 and are adapted to engage a forward and rearward face thereof of a cam-like formation when traveling along the guide 17 to permit operation of said chain when traveling in reverse directions. Each dog 31 has an inner beveled or inclined surface 33 which is adapted to rest on a beveled surface 34 of an intermediate link 35 interposed between the links to which said dogs and gathering flights are connected. Projections 36, 36 extend outwardly from opposite sides of each link 35. As herein shown, said projections have pins 37 extending inwardly therefrom which are adapted to engage angularly disposed aligned slots 38, 38 formed in opposite sides of each dog 31.

Figures 1, 4 and 5, best show the operation of the device, and in looking at these figures, it will be seen that as the flight 27 initially rounds the drive sprocket 22 that relative movement between the links 24, 35 and 29 causes the trailing dog 31 to be moved rearwardly with respect to said flight and at the same time causes the leading dog controlled by the pins 37 engaging the slots 38 to be moved forwardly with respect to said flight and permits said flight to fold rearwardly along the chain. In Figure 5 the flight 27 has advanced around the drive sprocket a greater distance than in Figure 1 and its associated link is entering the chain guide 17. Upon further movement of said flight along said chain guide relative movement between the links 29 and 35 will engage the engaging surface of the trailing dog with the cam-like surface of said flight and pivot said flight forwardly until it reaches the laterally extended position shown in Figure 1, it being understood that movement of said dog is controlled by engagement of the slots 38 with the pins 37. As said flight moves along the chain guides, it will react against the trailing dog which will hold it in a laterally extended position with respect to the chain during the conveying operation.

Means are provided to prevent the flights from folding rearwardly with respect to the chain at the gathering end of the conveyer, as they round the idler sprocket 21. Said means, as herein shown, comprises a disk 41 secured to the upper side of the sprocket 21 for rotation therewith. The diameter of said disk is slightly greater than the width of the chain guide 17 and said disk is adapted to be engaged by relatively widely spaced engaging abutments 43, 43 extending inwardly from opposite sides of each of said flights.

From the foregoing it is apparent that the device of my invention is so arranged that a simplified means has been provided for holding the flights in a laterally extended position with respect to the chain during the gathering and conveying operations and delaying the sweeping or swinging action of said flights as they round the drive sprocket at the discharge end of the conveying mechanism to minimize the tendency of said flights to sweep material from the secondary or discharge conveyer and permit said discharge conveyer to be spaced relatively close to the gathering conveyer and thus conserve in vertical dimensions of said gathering conveyer and the entire machine. It is also apparent that this means is efficiently arranged in a simplified and novel manner so as to be positive acting and reversible.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated, excepting as it may be limited in the appended claims.

I claim as my invention:

1. In a gathering conveyer, a pan, a gathering mechanism movable along said pan including an orbitally movable continuous chain having a plurality of flights, pivotally mounted thereon and adapted to extend laterally therefrom while moving along said pan, means for permitting said flights to fold rearwardly along said chain at one end of said pan, and means for holding said flights in a laterally extended position with respect to said chain at the other end of said pan comprising a rotatable disk, and engaging abutments extending inwardly and laterally from said flights on opposite sides of the center lines thereof for engagement with said disk.

2. In a gathering conveyer, a pan having an entering end disposed adjacent the ground and a discharge end disposed above the ground, gathering mechanism movable along said pan including an orbitally movable continuous chain having a plurality of flights pivotally mounted thereon and adapted to extend laterally therefrom while moving along said pan, a drive sprocket at the discharge end of said pan, and a direction changing device about which said chain turns at the entering end of said pan, and means for holding said flights in a laterally extended position with respect to said chain at the entering end of said pan comprising a rotatable disk of a larger diameter than said direction changing device, and engaging abutments extending inwardly and laterally from said flights on opposite sides of the center lines thereof for engagement with said disk.

3. In a gathering conveyer, a pan having an entering and discharge end, and a gathering device on said pan supported for movement therealong in a closed path comprising a pair of sprockets on said pan arranged adjacent the entering and discharge ends thereof, an endless chain trained around said sprockets having spaced flights pivotally mounted thereon and adapted to extend laterally therefrom, means for holding said flights in a laterally extended position with respect to said chain when traveling along said pan between said sprockets and permitting said flights to fold rearwardly with respect to said chain when rounding said sprocket disposed adjacent the discharge end of said pan, and other means for holding said flights in a laterally extended position with respect to said chain when rounding said sprocket adjacent the entering end of said pan comprising a disk rotatable about an axis coaxial with the axis of said sprocket, and engaging abutments extending inwardly from said flights on opposite sides of the center lines thereof for engagement with said disk.

4. In a gathering conveyer, a pan having an entering and discharge end, and a gathering device on said pan supported for movement therealong in a closed path comprising a pair of sprockets on said pan arranged adjacent the entering and discharge ends thereof, an endless chain trained around said sprockets having spaced flights pivotally mounted thereon and adapted to extend laterally therefrom, means for holding said flights in a laterally extended position with respect to said chain when traveling along said pan between said sprockets and permitting said flights to fold rearwardly with respect to said chain when rounding said sprocket disposed adjacent the discharge end of said pan, and other means for holding said flights in a laterally extended position with respect to said chain when rounding said sprocket adjacent the entering end of said pan comprising a disk coaxial with and rotatably driven by the sprocket disposed adjacent the entering end of said pan, and engaging abutments extending inwardly from said flights on opposite sides of the center lines thereof for engagement with said disk.

5. In a conveyer, a pan, a continuous chain movable in an orbital path along said pan, a flight extending laterally from said chain for movement along said pan, said flight being mounted on said chain for pivotal movement with respect thereto about an axis perpendicular to the plane of travel of said chain, means for holding said flight in a laterally extended position relative to said chain for conveying material along said pan and permitting said flight to fold rearwardly along said chain when discharging material from said pan including a dog pivotally connected to said chain rearwardly of said flight for controlled movement about its axis of pivotal connection to said chain and having engagement with the rearward face of said flight.

6. A conveyer in accordance with claim 5, wherein the flight has a cam-like surface adapted to be engaged by said dog, whereby said dog may permit said flight to fold rearwardly along said chain or move said flight in a laterally extended position with respect to said chain.

7. A conveyer in accordance with claim 5, wherein movement of the dog is controlled by means disposed on a link of said chain interposed between the link to which said dog is connected and the link to which said flight is connected.

8. A conveyer in accordance with claim 5, wherein movement of the dog is controlled by means disposed on a link of said chain interposed between the link to which said dog is connected and the link to which said flight is connected and wherein said means comprises a pin and slot connection between said link and dog.

9. A conveyer in accordance with claim 5, wherein another dog similar to said first-mentioned dog is disposed on the opposite side of said flight to permit operation of said chain in reverse directions.

10. In a gathering conveyer, a pan, and gathering devices supported on said pan for movement therealong in a closed path comprising a pair of sprockets on said pan, an endless chain trained around said sprockets having flights pivotally mounted thereon and adapted to extend laterally therefrom, and means for holding said flights in laterally extended positions relative to said chain and permitting said flights to pivot in a rearward direction with respect to said chain when rounding said sprocket at the discharge end of said pan including a dog pivotally connected to said chain rearwardly of each of said flights for engagement therewith, pivotal movement of said dogs being controlled by relative movement of the links of said chain with respect to each other.

11. A gathering conveyer in accordance with claim 10, wherein said flights have a cam-like surface adapted to be engaged by said dogs whereby said dogs may permit said flights to fold rearwardly along said chain as they initially round said sprocket and move said flights in a laterally extended position with respect to said chain when they reach the opposite side of said sprocket.

12. A gathering conveyer in accordance with claim 10, wherein each dog is pivotally mounted on said chain at a point spaced two links from its associated flight and wherein means disposed on a link of said chain interposed between the link to which said dog is connected and the link to which said flight is connected are provided for controlling pivotal movement of said dog.

13. A gathering conveyer in accordance with claim 10, wherein each dog is pivotally mounted on said chain at a point spaced two links from its associated flight and wherein a pin and slot connection is provided between a link of said chain interposed between the link to which said dog is connected and the link to which said flight is connected, and said dog for controlling pivotal movement of said dog to permit its associated flight to move rearwardly along said chain as it initially rounds said sprocket and move said flight to a laterally extended position with respect to said chain as it reaches the opposite side of said sprocket.

14. A gathering conveyer in accordance with claim 10, wherein other dogs similar to said first-mentioned dogs are disposed on opposite sides of said flights to permit operation of said chain in reverse directions.

15. A gathering conveyer in accordance with claim 10, wherein means are provided for holding said flights in a laterally extended position with respect to said chain when rounding said other sprocket.

16. A gathering conveyer in accordance with claim 10, wherein means are provided for holding said flights in a laterally extended position with respect to said chain when rounding said other sprocket which comprise a disk rotatable about an axis coaxial with said sprocket and adapted to be engaged by said flights.

17. A gathering conveyer in accordance with claim 10, wherein means adapted to be engaged by said flights and rotatably driven by said idler sprocket are provided for holding said flights in a laterally extended position with respect to said chain when rounding said idler sprocket.

18. A gathering conveyer in accordance with claim 10, wherein means are provided for holding said flights in a laterally extended position with respect to said chain when rounding said other sprocket which comprise engaging members which extend from said flights inwardly from the axes of pivotal connection of said flights to said chain, and a disk rotatable about an axis coaxial with said sprocket adapted to be engaged by said engaging members.

19. A gathering conveyer in accordance with claim 10, wherein means are provided for holding said flights in a laterally extended position with respect to said chain when rounding said other sprocket which comprise engaging members which extend from said flights inwardly from the axes of pivotal connection of said flights to said chain, and a disk rotatably driven by said sprocket and adapted to be engaged by said engaging members.

20. In a gathering conveyer, a pan having an entering and discharge end, and a gathering device on said pan supported for movement therealong in a closed path comprising a pair of sprockets on said pan arranged adjacent the entering and discharge ends thereof, an endless chain trained around said sprockets having spaced flights pivotally mounted thereon and adapted to extend laterally therefrom, means for holding said flights in a laterally extended position with respect to said chain when traveling along said pan between said sprockets and permitting said flights to fold rearwardly with respect to said chain when rounding said sprocket disposed adjacent the discharge end of said pan including a plurality of dogs pivotally connected to said chain rearwardly of said flights for controlled pivotal movement with respect to said chain and adapted to have engagement with said flights, and means for holding said flights in a laterally extended position when said chain is rounding said sprocket adjacent the entering end of said pan comprising a rotatable disk.

FRANK CARTLIDGE.